US006550606B2

(12) United States Patent
Tapp

(10) Patent No.: US 6,550,606 B2
(45) Date of Patent: Apr. 22, 2003

(54) PIVOT LIMITING MECHANISM FOR TROUGHING IDLER

(75) Inventor: Allan G. Tapp, Marmora (CA)

(73) Assignee: Metso Minerals Canada Inc., Belleville (CA)

( * ) Notice: Subject to any disclaimer, the term of this patent is extended or adjusted under 35 U.S.C. 154(b) by 0 days.

(21) Appl. No.: 09/941,204

(22) Filed: Aug. 28, 2001

(65) Prior Publication Data

US 2002/0050444 A1 May 2, 2002

Related U.S. Application Data

(63) Continuation-in-part of application No. 09/661,270, filed on Sep. 13, 2000, now abandoned.

(51) Int. Cl.[7] .............................................. B65G 39/16
(52) U.S. Cl. ..................................... 198/808; 198/825
(58) Field of Search ................................. 198/808, 818, 198/819, 824, 826, 830

(56) References Cited

U.S. PATENT DOCUMENTS

| 2,109,925 | A | 3/1938 | Mitchell | 198/202 |
|---|---|---|---|---|
| 3,240,321 | A | 3/1966 | Lo Presti et al. | 198/202 |
| 3,880,275 | A | 4/1975 | Fischer et al. | 198/192 |
| 4,032,002 | A | * 6/1977 | Jackson | 198/808 |
| 4,475,648 | A | 10/1984 | Weeks | 198/830 |
| 4,917,232 | A | 4/1990 | Densmore | 198/830 |
| 5,031,753 | A | 7/1991 | Tschantz | 198/819 |
| 5,318,170 | A | 6/1994 | Kokolis | 198/825 |
| 5,373,935 | A | 12/1994 | Anderson | 198/808 |

FOREIGN PATENT DOCUMENTS

GB          2 198 179         6/1988

* cited by examiner

Primary Examiner—James R. Bidwell
(74) Attorney, Agent, or Firm—Andrus, Sceales, Starke & Sawall, LLP

(57) ABSTRACT

A troughing idler for use in supporting a conveyor belt of a troughed belt conveyor system in which the troughing idler includes a pair of spaced center rolls and a pair of angled side troughing rolls. The pair of center rolls are mounted to a pivot bracket and their axes of rotation are spaced from each other by a span length. The center rolls are selected such that each center roll has the same outer diameter. The size of the center rolls is selected such that the outer diameter of the center rolls is greater than the outer diameter of each side troughing roll. The increase in the outer diameter of the center rolls relative to the outer diameter of the side troughing rolls reduces the amount of indentation resistance for the troughing idler. The troughing idler further includes a pivot limiting mechanism that limits the amount of clockwise and counterclockwise rotation of the pivot brackets used to support the pair of center rolls.

11 Claims, 7 Drawing Sheets

PIVOT LIMITING MECHANISM FOR TROUGHING IDLER

CROSS REFERENCE TO RELATED APPLICATION

The present application is a continuation-in-part application of U.S. patent application Ser. No. 09/661,270, filed Sep. 13, 2000, now abandoned.

BACKGROUND OF THE INVENTION

The present invention relates to a troughing idler for use in supporting a conveyor belt in a troughed conveyor system. More specifically, the present invention relates to a troughing idler that includes a pair of center rolls that each have a larger outer diameter than a pair of side troughing rolls in order to reduce the indentation resistance of the troughing idler. Further, the present invention relates to a troughing idler in which the center rolls are mounted between a pair of pivot brackets whose rotation is limited by a pivot limiting mechanism.

Troughed belt conveyor systems have long been used to transport bulk material from one location to another. Troughed belt conveyors are particularly useful in transferring bulk material between distant points at a mine or quarry. Typically, the troughed belt conveyor system includes a series of spaced troughing idler assemblies positioned along the length of a moving conveyor belt to support the conveyor belt over its length. Each of the troughing idlers includes a rotatable center idler roll and a pair of side troughing idler rolls that are positioned at a troughing angle relative to the center roll to define the trough for transporting the bulk material.

The amount of force required to move the belt and bulk material over a troughing idler including the center roll and pair of side troughing rolls depends on two main components which include the turning resistance required to rotate each of the troughing rolls and the center roll and the rolling resistance of the belt and the material as they travel over the idler rolls of the troughing idler.

Generally, the turning resistance required to rotate each of the rolls of the troughing idler can be broken down into two main components which include the resistance of the roll to turning about the shaft due to bearing, seal, grease and other frictional resistances and the resistance due to sliding of the belt over the rolls of a misaligned idler. The rolling resistance can be broken down into three main components which include the resistance due to the indentation of the rolls into the conveyor belt, the resistance due to the flexure of the belt over the idler rolls, and the resistance due to the flexure of the material over the idler rolls.

As can be understood by the above discussion, a reduction in the resistance in any one of the areas listed increases the efficiency of the troughed belt conveyor system and thus requires less energy to transport the same amount of material.

The indentation resistance discussed above is caused by the idler rolls indenting in the bottom cover of the conveyor belt under the weight of the belt and the supported material. Referring now to FIG. 7, the weight of the material on the belt sets up a contact pressure distribution as illustrated by the area 10 shown in FIG. 7. The contact pressure can be resolved into a vertical force 12 by integrating the pressure over the contact length. The pressure distribution is symmetrical about the centerline of the idler roll 14 when the conveyor belt 16 is stopped. Therefore, the vertical contact force 12, which acts through the centroid of the pressure distribution, is on the centerline of the idler roll 14.

However, when the conveyor belt 16 is moving, the viscoelastic properties of the rubber cause a non-symmetrical pressure distribution as illustrated in FIG. 8. When the conveyor belt 16 is moving, the conveyor belt 16 is indented (compressed) on the approach side of the centerline of the idler roller 14. On the opposite side of the centerline, the rubber, due to its natural properties, is unable to uncompress fast enough and the contact length on the downstream side of the centerline of the idler roll is shortened. As illustrated in FIG. 8, the conveyor belt 16 loses contact with the idler roll at position 18 and does not fully relax until position 20. Because of the shortened contact link, the contact pressure increases, as illustrated by area 22. Additionally, the vertical contact force, as illustrated by arrow 24, is now non-symmetrical with the centerline of the idler roll 14 such that the vertical force 24 is offset toward the upstream, approach side from the centerline of the idler roll 14. The offset of the vertical force 24 causes a moment that must be compensated for by a horizontal force 26 tangent to the idler roll 14. The horizontal force 26 times the radius of the idler roll 14 must equal the vertical contact force 24 times the distance it is offset from the centerline. This horizontal force 26 represents the indentation rolling resistance.

As can be understood by the discussion above, decreasing the amount of indentation resistance caused by the idler rolls indenting will result in more efficient operation of the troughed belt conveyor system and thus in energy savings by the owner of the conveyor system. Additionally, a reduction in the resistance due to the flexure of the belt over the idler rolls and the resistance due to the flexure of the material over the idler rolls further increases the efficiency of the conveyor system. Therefore, it is an object of the present invention to provide a troughing idler for use in a troughed belt conveyor system that reduces the amount of indentation resistance and the amount of belt and material resistance.

SUMMARY OF THE INVENTION

The present invention is a troughing idler for use in supporting a moving conveyor belt of a troughed belt conveyor. The troughing idler generally includes a support frame extending along that mounts a pair of side troughing rolls at a troughing angle. In addition to the pair of side troughing rolls, the troughing idler of the present invention includes a pair of center rolls spaced from each other. The rotational axes of each center roll are parallel to each other and are spaced a common distance from the longitudinal axis of the support frame. The center rolls are each rotatably mounted between a pair of pivot brackets that are pivotable about a center pivot shaft. The pivot shaft extends along the longitudinal axis of the support frame such that the center rolls are equally spaced from the longitudinal axis of the support frame.

The pivotal rotation of the pair of pivot brackets is restricted and controlled by a pivot limiting mechanism of the present invention. The pivot limiting mechanism allows the pair of pivot brackets to rotate about a center pivot shaft in order to equalize the load felt by each of the center rolls. The equalization of the load across the pair of center rolls aids in reducing the energy consumed by the rotation of the center rolls. In the present invention, the pivot limiting mechanism includes a stop member mounted to the pivot brackets to limit the maximum rotation of the pivot brackets. The limitation on the pivoting motion of the pivot brackets prevents the pivot brackets from over-rotating into contact with the moving conveyor belt should one of the center rolls become dislodged from the pivot bracket.

In accordance with the present invention, the outer diameter of the two center rolls are equal such that the center rolls equally split the forces from the moving conveyor belt between the two center rolls. In prior art troughing idlers, the center roll and the pair of side troughing rolls have the same outer diameter such that a single size idler roll can be used as either of the side troughing rolls or either of the center rolls. In the present invention, the outer diameter of each of the center rolls is greater than the outer diameter of the two side troughing rolls. Preferably, the outer diameter of each of the center rolls is at least one inch larger than the outer diameter of the side troughing rolls. The increase in the outer diameter of the center rolls, along with utilizing two center rolls rather than a single center roll, greatly reduces the total indentation resistance for the troughing idler.

The troughing idler of the present invention therefore includes a pair of center rolls spaced from each other in a direction parallel to the direction of travel of the conveyor belt being supported by the troughing idler. The fore/aft configuration of the pair of center rolls functions to reduce both the belt and material flexure resistance for the troughing idler. Additionally, the pair of center rolls in the troughing idler of the present invention each have an outer diameter greater than the outer diameter of the pair of side troughing rolls. The combination of the increased diameter of the center rolls as well as the split of the center roll into two center rolls greatly reduces the amount of total indentation resistance for the troughing idler.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
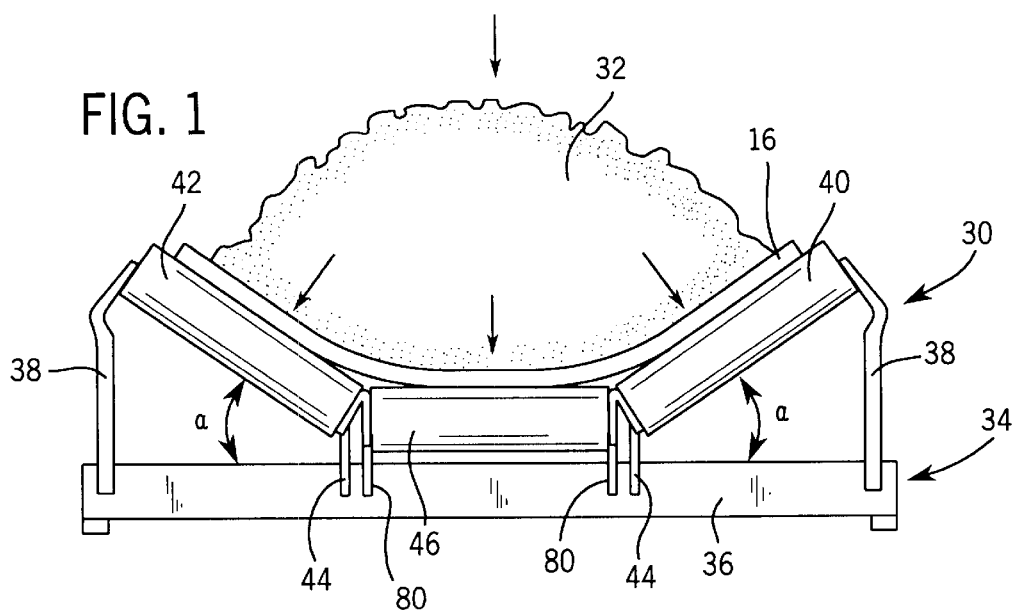
FIG. 1 is a section view illustrating a troughed conveyor belt supported by a troughing idler thereby illustrating the operation of the troughed belt conveyor system.
Figure 7:
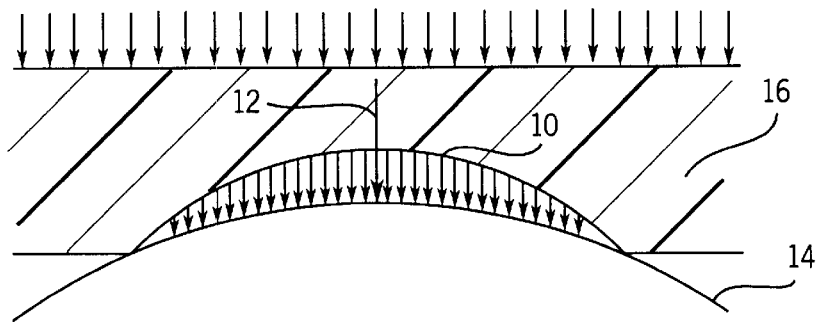
FIG. 7 is a force diagram illustrating the vertical force created by the conveyor belt and supported material on an idler roll when the conveyor belt is stationary.
Figure 8:
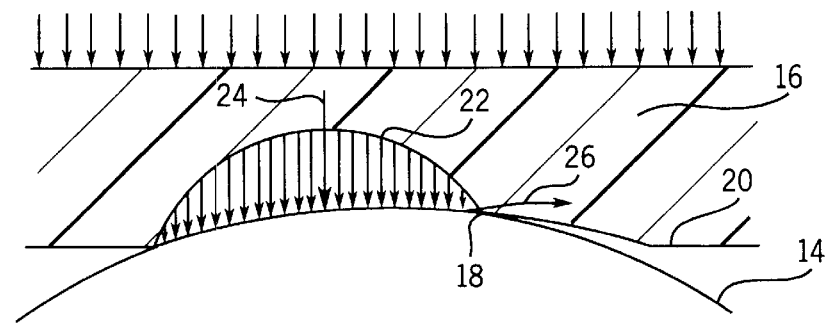
FIG. 8 is a force diagram illustrating the vertical force created by the conveyor belt and material on the idler roll when the conveyor belt and idler roll are in motion.

Referring first to FIG. 1, thereshown is a conventional troughing idler 30 that supports and troughs the conveyor belt 16 used to transport the bulk material 32. The troughing idler 30 generally includes a support frame 34 having a base 36 extending transverse to the direction of conveyor belt travel and a pair of spaced upright supports 38. The upright supports 38 each rotatably support one end of the side troughing rolls 40 and 42. The opposite end of each of the side troughing rolls 40 and 42 is supported by one of two support brackets 44 secured to the base 36. In addition, a single center roll 46 is also rotatably supported between the support brackets 44.

Each of the side troughing rolls 40 and 42 and the center roll 46 are freely rotatable about a rotational axis. As can be seen in FIG. 1, the rotational axis of each of the side troughing rolls 40 and 42 extends at a troughing angle α relative to the generally horizontal rotational axis of the center roll 46. The troughing angle α at which the side troughing rolls 40 and 42 are positioned creates the trough upon which the conveyor belt 16 is supported As can be seen in FIG. 1, the load 32 exerts a downward force on the conveyor belt 16, which is transferred to the pair of side troughing rolls 40 and 42 as well as the center roll 46. In the standard troughing idler of FIG. 1, approximately 70% of the weight of the load is supported by the center roll 46, while each of the side troughing rolls 40 and 42 supports approximately 15% of the weight of the load.

The indentation resistance for an evenly distributed line load on the center idler roll has been defined by researchers as:

$$F_{RR_i} = C_i * D^{-\frac{2}{3}} * F_{vr}^{\frac{4}{3}}$$

where:
 $F_{RR_i}$≡indentation resistance (lb)
 $C_i$≡indentation losses coefficient
 D≡idler roll diameter (in)
 $F_{vr}$≡vertical load on roll (lb)

Figure 2:
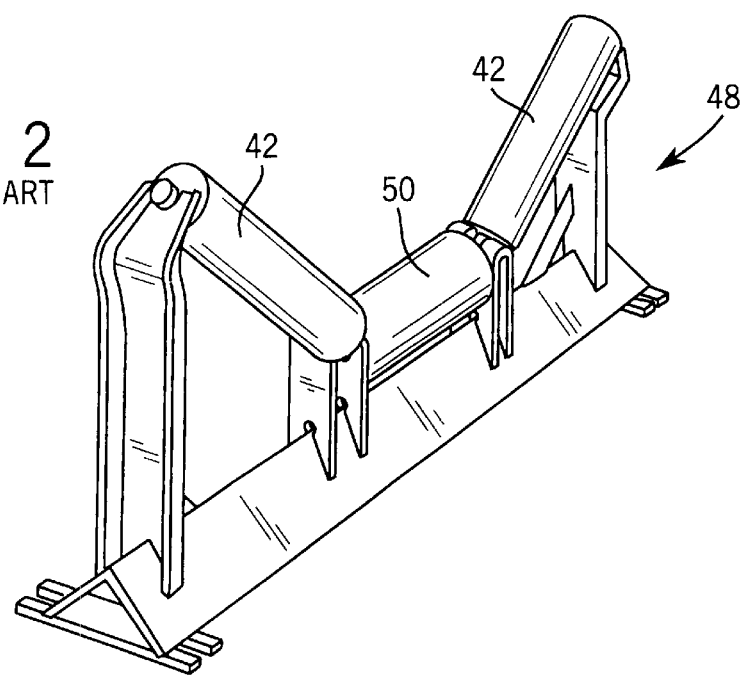
FIG. 2 is a perspective view illustrating a second prior art embodiment of a troughing idler for use with a troughed belt conveyor system in which the single center roll has a larger diameter than the pair of side troughing rolls.

Referring now to FIG. 2, thereshown is a recent improvement of the prior art that is aimed at reducing the amount of indentation resistance from the center roll. In the troughing idler 48 illustrated in FIG. 2, the side troughing rolls 40 and 42 are formed having a first outer diameter, while the center roll 50 has an outer diameter that is greater than the outer diameter of the pair of side troughing rolls 40 and 42. For example, in a contemplated embodiment, each of the side troughing rolls 40 and 42 has an outer diameter of 6" while the center roll 50 has an outer diameter of 8".

As discussed previously, conventional troughing idlers, such as shown in FIG. 1, include identical idler rolls that form the pair of side troughing rolls 40 and 42 as well as the center roll 46. In the prior art system illustrated in FIG. 2, the outer diameter of the center roll 50 is increased relative to the diameter of the side troughing rolls 40 and 42. By increasing the roll diameter of the center roll 50, the reduction in the indentation resistance at the center roll is given by the following equation:

$$\text{Reduction in } F_{RR_i} = \left[ 1 - \left(\frac{D_2}{D_1}\right)^{-\frac{2}{3}} \right] * 100\%$$

where:
$D_1$ ≡ roll diameter (in)
$D_2$ ≡ increased roll diameter (in)

| | |
|---|---|
| 5" to 6" reduction = 11.4% | 6" to 7" reduction = 9.8% |
| 5" to 7" reduction = 20.1% | 6" to 8" reduction = 17.5% |
| 5" to 8" reduction = 26.9% | 7" to 8" reduction = 8.5% |

As can be seen by the above equation and calculations, increasing the size of the center roll 50 results in a significant reduction in the amount of indentation resistance.

Although increasing the diameter of all three of the rolls in the troughing idler 48 shown in FIG. 2 would decrease the indentation resistance, the increase in the diameter of the side troughing rolls 40 and 42 increases the cost of the rolls. Since only a small portion of the indentation resistance is caused by the side troughing rolls 40 and 42, the extra reduction in indentation resistance due to three large rolls rather than just a larger center roll 50 is generally not cost-justified.

Figure 3:
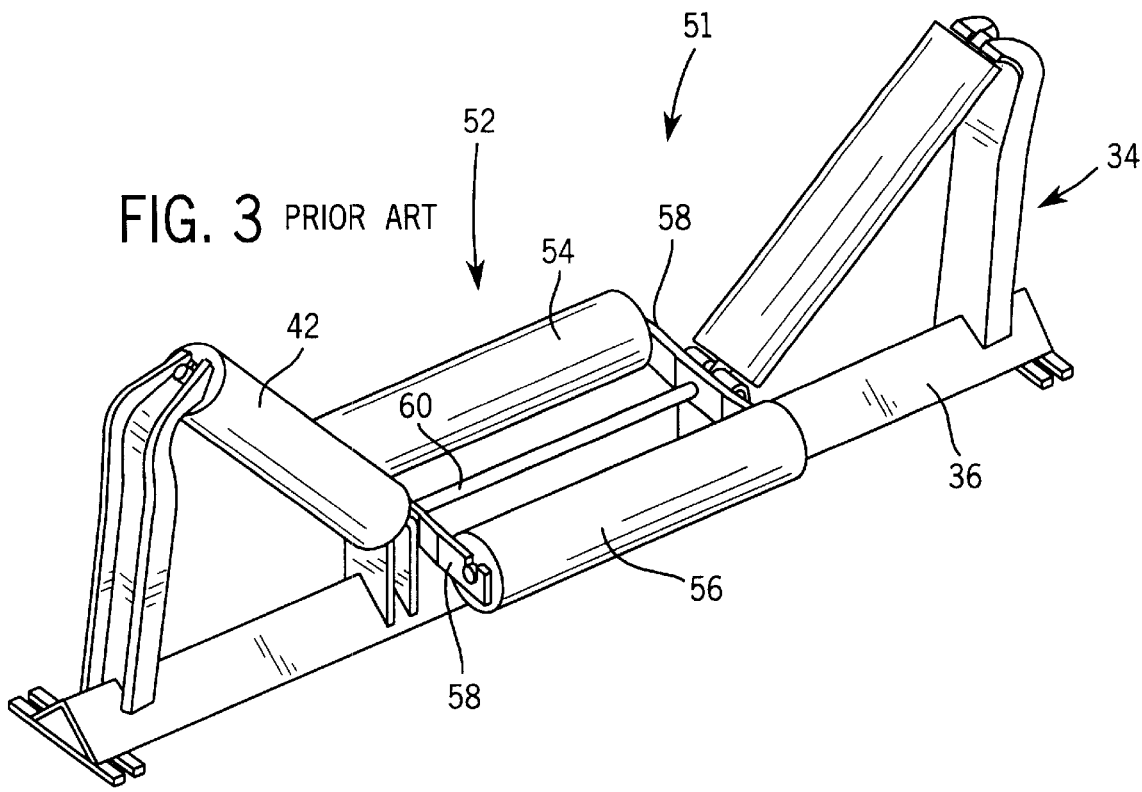
FIG. 3 is a perspective view illustrating a prior art troughing idler including a pair of side troughing idler rolls and a pair of center idler rolls, each of the idler rolls having the same outer diameter.

In addition to the troughing idler 48 shown in FIG. 2, another proposed improvement for increasing the troughing idler efficiency is illustrated by the troughing idler 51 of FIG. 3. As illustrated in FIG. 3, the single center roll of a conventional troughing idler is replaced by a center roll assembly 52 that includes a pair of center rolls 54 and 56. The center rolls 54 and 56 are mounted between a pair of pivot brackets 58 that are each pivotable about a center pivot shaft 60. As can be seen in FIG. 3, the rotational axis of each of the center rolls 54 and 56 is spaced from the generally horizontal axis that passes through the base 36 of the support frame 34. Specifically, the rotational axis of the first center roll 54 is generally parallel to and spaced from the pivot shaft 60 an equal distance and in the opposite direction to the rotational axis of the second center roll 56.

The fore/aft configuration of the pair of center rolls 54 and 56 in the troughing idler 51 of FIG. 3 has proven to reduce the amount of resistance due to the flexure of the belt over the idler rolls and the resistance due to the flexure of the material over the idler rolls. During the transportation of bulk material by the conveyor belt over each troughing idler, the belt and material are bent into a convex shape at the troughing idler and into a concave shape over the distance between successive troughing idlers. During transportation of the bulk material between idlers, the belt and the material deflect downward and take on a much more rounded shape when viewed as a cross-section. By the time the belt and the bulk material arrive at the next troughing idler, the material and belt are pushed back into the troughing idler shape. The work losses from the continuous flexing of the belt and the bulk material and the reshaping of the belt and material between idlers leads to the flexure resistance component of the total rolling resistance.

The amount of belt and material flexure resistance at a conventional idler having a single center roll can be expressed as:

$$F_{RR_{bmf}} = \frac{C_{bmf}}{8*T} * (W_b + W_m)^2 * S_i^2$$

where:
$F_{RR_{bmf}}$ ≡ belt and material flexure resistance (lb)
$C_{bmf}$ ≡ belt and material flexure losses coefficient
T ≡ belt tension (lb)
$W_b$ ≡ belt weight (lb/ft)
$W_m$ ≡ material weight (lb/ft)
$S_i$ ≡ idler spacing (ft)

As the above equation illustrates, the belt and material flexure resistance is dependent upon the spacing between adjacent idlers.

The troughing idler 51 illustrated in FIG. 3 includes the pair of center rolls 54 and 56. The two center rolls 54 and 56 on the idler 51 can be considered as two adjacent conventional idlers. Thus, when calculating the flexure resistance, one idler would have a spacing equal to the center roll span between the fore and aft center rolls 54 and 56 and the next idler would have the spacing equal to the distance between the aft center roll of the first idler and the fore center roll of the second troughing idler. The resulting belt and material flexure resistance with the pair of center rolls 54 and 56 can be calculated by:

$$F_{RR_{bmf}} = \frac{C_{bmf}}{8*T} * (W_b + W_m)^2 * ((S_i - S_c)^2 + S_c^2)$$

where:
$S_c$ ≡ center roll span (ft)

Intuitively, the reduction in the center roll span alone by using the dual center roll configuration does not produce a 100% effect on reducing the flexure resistance. Although the fore/aft configuration of the center rolls significantly effects the belt sag in a vertical plane, there is more than just the sag along the center roll that causes flexure resistance. Therefore, an efficiency factor of between 50% and 75% is used. The reduction in belt and material flexure resistance due to the fore/aft configuration of the center rolls 54 and 56 in the troughing idler 51 is estimated as:

$$\text{Reduction in } F_{RR_{bmf}} = \left[ \frac{E_f}{100} * \left( 1 - \frac{[(S_i - S_c)^2 + (S_c)^2]}{S_i^2} \right) \right] * 100\%$$

where:
$E_f$ ≡ effect of fore/aft orientation (%)
$S_i$ ≡ idler spacing (ft)
$S_c$ ≡ ESI centre roll span (ft)

As the above formula for a troughing idler having a pair of center rolls 54 and 56 indicates, the greater the span between the rotational axes of the center rolls 54 and 56, the more savings in the belt and material flexure resistance. However, field tests have indicated that when the center roll span gets too long, the savings on the overall rolling resistance is significantly reduced. For example, tests were conducted on center roll spans of 10.5", 18", 27" and 36" on a conveyor with 6' spacing between successive troughing idlers. Although it was contemplated that the 36" center roll span would optimize the energy savings, it was found that the 10.5" and 18" center roll spans provided significantly better savings than the 27" and 36" center roll spans. It is contemplated that the longer center roll spans resulted in the lower portions of the two side troughing rolls 40 and 42 to take on more load due to the belt and material acting as a very flexible beam. This much higher than normal contact pressure was resulting in most of the savings to be lost. Therefore, a span of approximately 10.5" to 18" between the two center rolls 54 and 56 is contemplated as providing the greatest savings for the troughing idler shown in FIG. 3.

In addition to reducing the belt and material flexure resistance, replacing the single center roll with the fore/aft configuration of the pair of center rolls 54 and 56 also reduces the amount of indentation resistance at the center of the troughing idler. Specifically, the reduction in indentation resistance at the center roll of the troughing idler shown in FIG. 3 due to splitting the load equally between the pair of center rolls 54 and 56 is given by the following equation:

$$\text{Reduction in } F_{RR_i} = \left[1 - 2*(0.5)^{\frac{4}{3}}\right] * 100\% = 20.6\%$$

According to the above formula, the use of a pair of center rolls in the troughing idler reduces the amount of indentation resistance approximately 20.6%. However, there is not a 100% effective reduction in the amount of indentation resistance because the indentation resistance on the side troughing rolls 40 and 42 has not changed. The amount of total reduction in the indentation resistance depends upon the distribution of the load between the center rolls and the side troughing rolls and thus depends on the troughing angle, belt width, belt weight, belt thickness, material density, percent loading, etc. Thus, the total reduction in the indentation resistance for a troughing idler employing the double center roll configuration can be expressed by the following equation:

$$\text{Reduction in } F_{RR_i} = \left[1 - \frac{\left(2*(0.5*f_{vc})^{\frac{4}{3}} + 1.227*\left(\frac{1-f_{vc}}{2}\right)^{\frac{4}{3}}\right)}{\left(f_{vc}^{\frac{4}{3}} + 1.227*\left(\frac{1-f_{vc}}{2}\right)^{\frac{4}{3}}\right)}\right] * 100\%$$

where:
 $f_{vc}$ ≡centre roll load factor
  =0.60 for 20° troughing
  =0.675 for 35° troughing
  =0.75 for 45° troughing
  =0.70 for 20°-45° troughing per CEMA Based upon the above formula, the calculated reduction in the total indentation resistance due to employing the double center roll configuration is approximately as follows: 16.1% for 20° troughing, 17.4% for 35° troughing, 18.5% for 45° troughing, and 17.8% when the CEMA load factor is used.

As can be seen in FIG. 3, each of the side troughing rolls 40 and 42 and each of the center rolls 54 and 56 is the same type of commercially available idler roll. Specifically, in the embodiment of the invention illustrated in FIG. 3, each of the idler rolls is 6" in diameter such that the idler rolls are replaceable between the side locations and the pair of center rolls.

Figure 4:
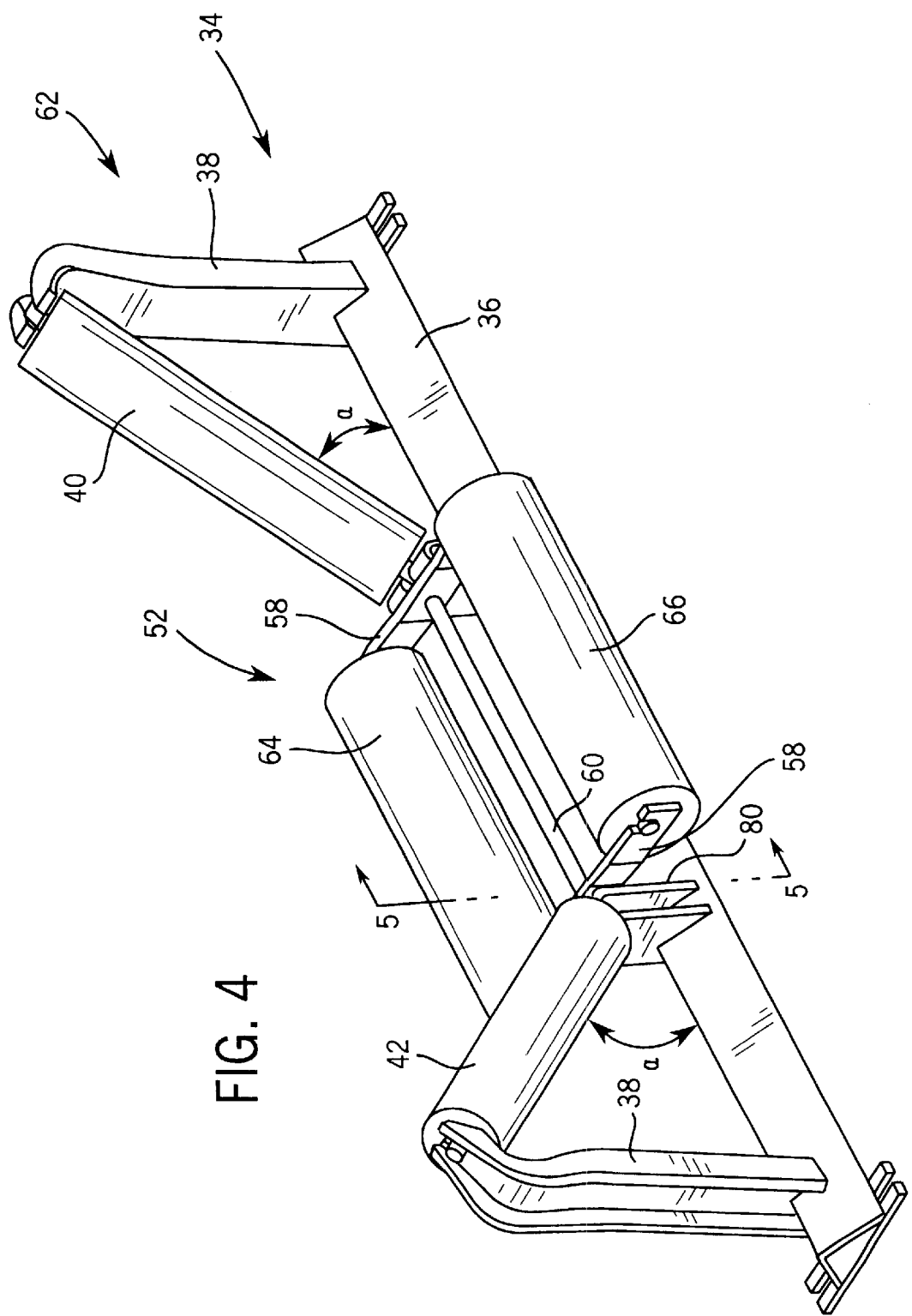
FIG. 4 is a perspective view illustrating the troughing idler of the present invention in which the pair of center rolls have an outer diameter larger than the outer diameter of each side troughing roll.

Referring now to FIG. 4, thereshown is a troughing idler 62 constructed in accordance with the present invention. The troughing idler 62 includes the support frame 34 having the base 36 and the pair of spaced upright supports 38. The troughing idler 62 includes a pair of side troughing rolls 40 and 42 that are each mounted at a troughing angle α relative to the generally horizontal longitudinal axis passing through the base 36 of the support frame 34.

Figure 6:
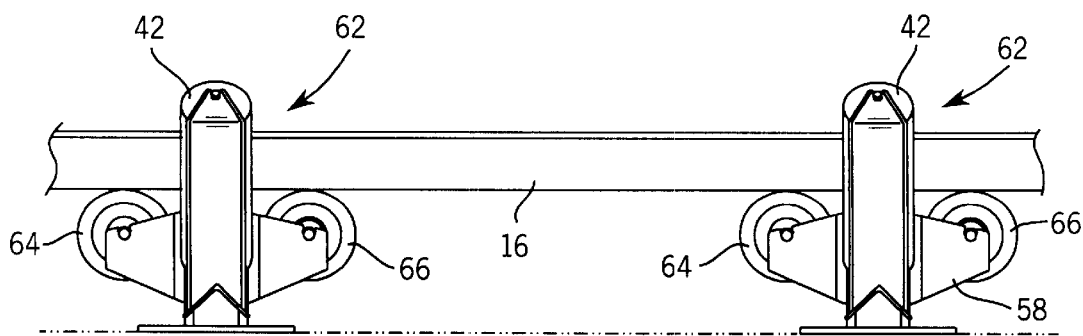
FIG. 6 is a side view illustrating a pair of troughing idlers of the present invention supporting the conveyor belt of the troughed belt conveyor system.

The troughing idler 62 includes a pair of center rolls 64 and 66 that each have their rotational axis positioned transverse to the direction of conveyor belt movement and spaced on opposite sides of the longitudinal axis passing through the base 36. The center rolls 64 and 66 are each mounted between the pair of pivot brackets 58 which are pivotable about the pivot shaft 60. The pivot brackets 58 and pivot shaft 60 allow the center roll assembly 52 to pivot such that the center rolls 64 and 66 remain in even contact with the conveyor belt 16, as can best be seen in FIG. 6. As discussed previously, the center roll span between the rotational axes of the center rolls 64 and 66 is preferably between 10.5" and 18" to maximize the efficiency of the troughing idler 62.

Referring back to FIG. 4, the center rolls 64 and 66 have the same outer diameter. However, unlike the prior art troughing idler 51 illustrated in FIG. 3, the outer diameter of the center rolls 64 and 66 is larger than the outer diameter of each of the side troughing rolls 40 and 42. The increase in the outer diameter of the pair of center rolls 64 and 66 reduces the amount of indentation resistance at the center roll. Specifically, the amount of reduction in the indentation resistance at the center rolls due to both an increase in the center roll diameter and the use of a pivoted pair of center rolls 64 and 66 is given by the following equation:

$$\text{Reduction in } F_{RR_i} = \left[1 - \left(\frac{D_2}{D_1}\right)^{-\frac{2}{3}} * 2 * (0.5)^{\frac{4}{3}}\right] * 100\%$$

As can be easily seen in the equation listed above, any increase in the diameter of the center rolls 64 and 66 directly reduces the amount of indentation resistance. Although any increase in the roll diameter appears possible, in practice the side rolls 40, 42 and center rolls 64, 66 are selected from one of the limited number of commercially available roll sizes presently on the market. For example, the most commonly available idler roll sizes are 5", 6", 71" and 8". Thus, increasing the center roll diameter and using a pair of center rolls has the following results:

| | | |
|---|---|---|
| 5"∅ ⇒ 6"∅ Reduction = 29.7% | | 6"∅ ⇒ 7"∅ Reduction = 28.4% |
| 5"∅ ⇒ 7"∅ Reduction = 36.6% | | 6"∅ ⇒ 8"∅ Reduction = 34.5% |
| 5"∅ ⇒ 8"∅ Reduction = 42.0% | | 7"∅ ⇒ 8"∅ Reduction = 27.4% |

As can be understood by the following equation in comparison to the calculations performed on the prior art embodiments of FIGS. 2 and 3, a combination of increasing the center roll diameter and splitting the center roll into two separate center rolls 64 and 66 reduces the amount of indentation resistance by a significant amount.

Although the above equation calculates the percent of reduction in the indentation resistance at the center rolls, in order to calculate the total reduction in indentation resistance, not just the center roll reduction, the proportion of the resistance on the side troughing rolls and that on the center rolls must also be taken into account. Based upon the significant amount of research that has been done on the distribution of loads over the three rolls in a conventional troughing idler, the following equation contemplates the total reduction in indentation resistance for a troughing idler employing both double center rolls and an increase in the center roll diameter relative to the outer diameter of the side troughing rolls:

Reduction in $$F_{RR_i} = \left[1 - \frac{\left[\left(\frac{D_2}{D_1}\right)^{-\frac{2}{3}} * 2*(0.5*f_{vc})^{\frac{4}{3}} + 1.227*\left(\frac{1-f_{vc}}{2}\right)^{\frac{4}{3}}\right]}{\left(f_{vc}^{\frac{4}{3}} + 1.227*\left(\frac{1-f_{vc}}{2}\right)^{\frac{4}{3}}\right)}\right]*100\%$$

In the above equation, the center roll load factor ($f_{vc}$) is 0.70 based upon the CEMA standard. Based upon this value, the reduction in the total indentation resistance for a troughing idler employing both the double center roll configuration and an increase in the outer diameter of the center rolls relative to the side troughing rolls is as follows:

| | | |
|---|---|---|
| 5"⌀ ⇒ 6"⌀ Reduction = 25.7% | 6"⌀ ⇒ 7"⌀ Reduction = 24.5% | |
| 5"⌀ ⇒ 7"⌀ Reduction = 31.6% | 6"⌀ ⇒ 8"⌀ Reduction = 29.8% | |
| 5"⌀ ⇒ 8"⌀ Reduction = 36.3% | 7"⌀ ⇒ 8"⌀ Reduction = 23.7% | |

As can be understood by the above calculations and equation, splitting the center roll into a pair of center rolls 64 and 66, as well as utilizing center rolls 64 and 66 that have a larger outer diameter than the side troughing rolls 40 and 42 substantially reduces the amount of total indentation resistance for the troughing idler 62. By decreasing the amount of indentation resistance, the troughing idler 62 requires the conveyor system to exert less energy to move the same load along the series of troughing idlers. As can also be understood by the previously introduced equations, if the center rolls are not pivoted, the center rolls will not split the load equally and the indentation resistance reductions will be less.

In addition to reducing the amount of the total indentation resistance, the fore/aft orientation of the center rolls 64 and 66 reduces the amount of belt and material flexure resistance. The combination of the reduction in the belt and material flexure resistance along with the reduction in the amount of total indentation resistance greatly increases the efficiency of the troughing idler conveyor system as compared to those currently available.

Figure 5:
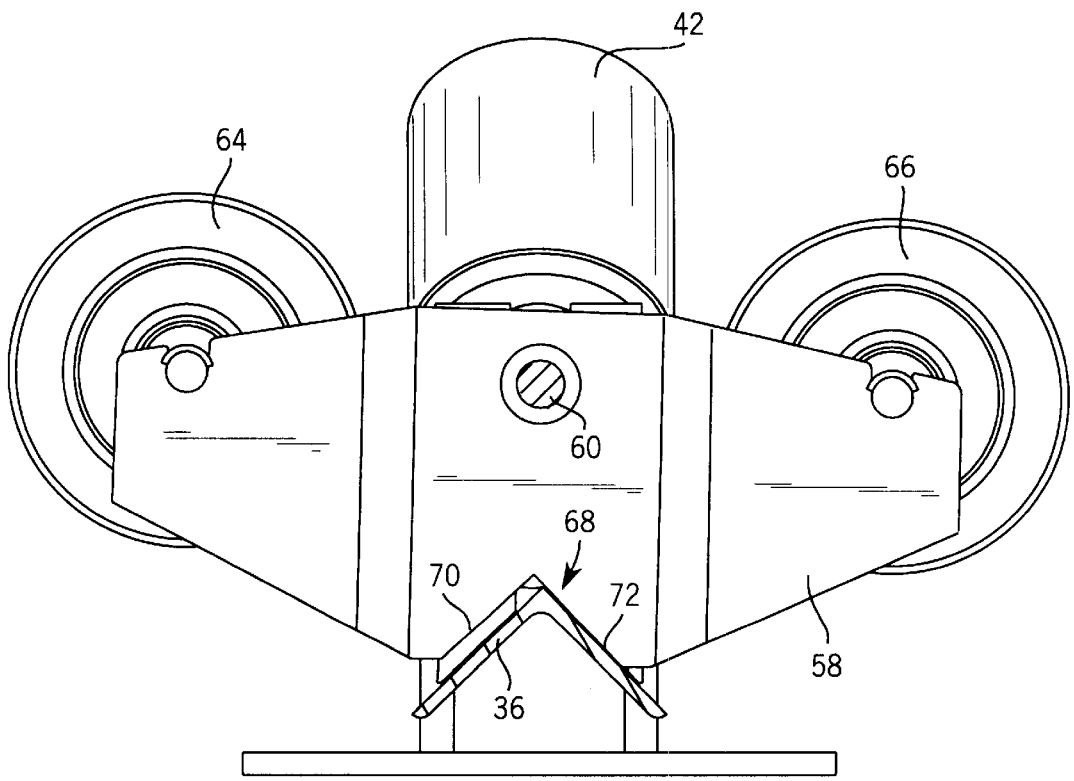
FIG. 5 is a section view taken along line 5—5 of FIG. 4 illustrating the mounting of the pair of center rolls and one of the side troughing rolls along a pivot bracket mounted to the support frame of the troughing idler.

Referring now to FIG. 5, thereshown is a sectional view of the mounting arrangement for the pair of center rolls 64 and 66. As can be seen in FIG. 5, the center rolls 64 and 66 are each mounted to the pivot bracket 58, which in turn is pivotable about the pivot shaft 60. The pivot brackets 58 each include a pivot notch 68 that is defined by a pair of side surfaces 70 and 72 that contact the angled base 36. The contact surfaces 70 and 72 limit the amount of pivotal movement of the pivot bracket 58 about the pivot shaft 60. The limited pivotal movement prevents the pivot brackets 58 from rotating too far upward should one of the center rolls 64 or 66 become dislodged. The limited amount of pivoting movement of the pivot bracket 58 prevents the pivot bracket 58 from damaging the conveyor belt should one of the center rolls 64 or 66 become dislodged. However, allowing the center rolls to pivot optimizes the indentation resistance reductions.

Although the pivot limiting mechanism illustrated in FIG. 5 includes the V-shaped pivot notch 68 that interacts with the V-shaped angled base 36, it is possible that the base could be replaced by a tubular member. If the base includes a tubular member rather than the V-shaped bracket 36, the pivot notch 68 would be replaced by a semi-circular notch that would limit the amount of pivoting rotation of the pair of pivot brackets 58.

Figure 9:
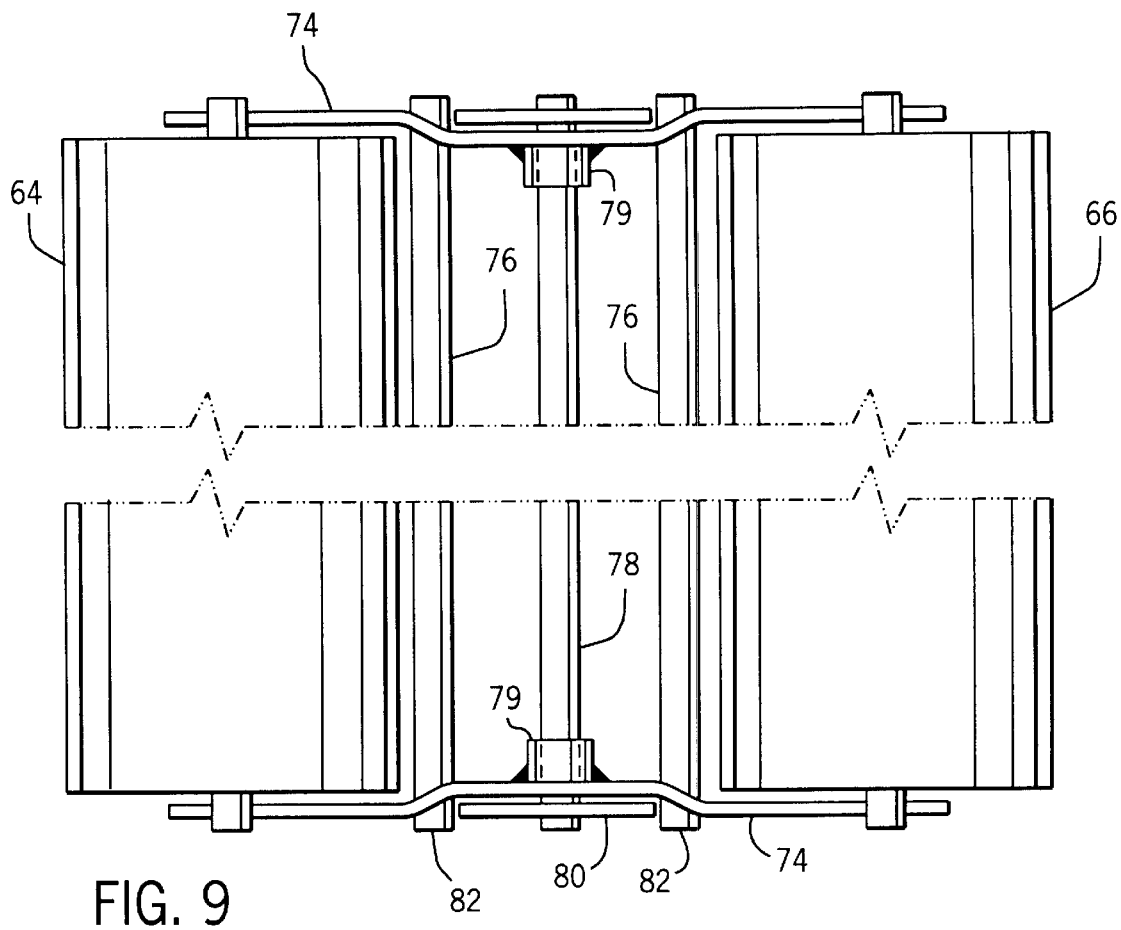
FIG. 9 is a top view illustrating a pivot limiting mechanism of a second embodiment of the invention.
Figure 10:
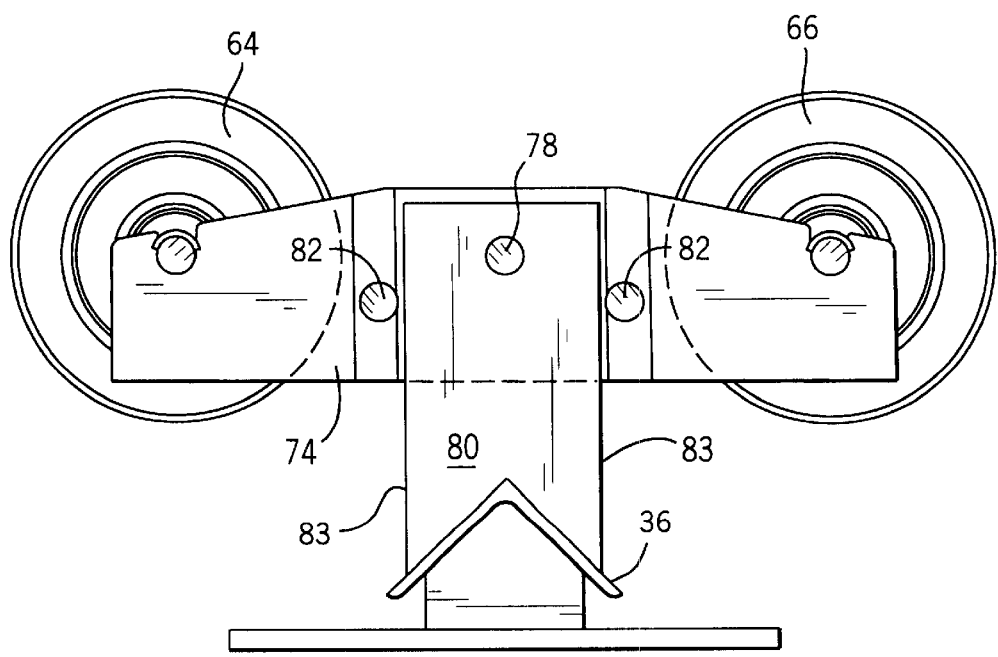
FIG. 10 is a side view of the pivot limiting mechanism of FIG. 9.

Referring now to FIGS. 9 and 10, there shown is a second embodiment of the pivot limiting mechanism of the present invention. As illustrated in FIGS. 9 and 10, the pair of center rolls 64 and 66 are mounted between a pair of spaced pivot brackets 74. As can be seen in FIG. 9, the pair of spaced pivot brackets 74 are joined to each other by a pair of cross braces 76 and a pivot shaft 78. The pivot shaft 78 is received in a pair of collars 79 attached to the inner surface of each pivot bracket 74. The cross braces 76 provide support for the pair of spaced pivot brackets 74, while the pivot shaft 78 defines the axis of rotation for the pair of brackets 74.

As can be seen in FIG. 10, the pivot shaft 78 is received within a mounting bracket 80, which is mounted to the angled base 36. The pivot shaft 78 allows the pair of spaced pivot brackets 74, and thus the center rolls 64 and 66, to rotate about the pivot shaft 78, as is generally illustrated by the arrows 81 in FIG. 11.

As illustrated in FIGS. 9 and 10, the cross braces 76 each extend through both of the pivot brackets 74 and define stop blocks 82. As illustrated, each of the stop blocks 82 protrude from the outer face surface of the pivot brackets 74. As shown in FIG. 10, the stop blocks 82 are spaced from each other by a distance slightly greater than the width of the mounting bracket 80.

When the pivot brackets 74 are in the completely balanced condition of FIG. 10, a space is created between each of the stop blocks 82 and the edges 83 of the mounting bracket 80. As the pair of pivot brackets 74 pivot about the pivot shaft 78, as shown in FIG. 11, the stop blocks 82 contact the edge surfaces 83 of the mounting bracket 80 to limit the amount of possible rotation of the pivot brackets 74 in both the clockwise and counter clockwise direction.

Figure 11:
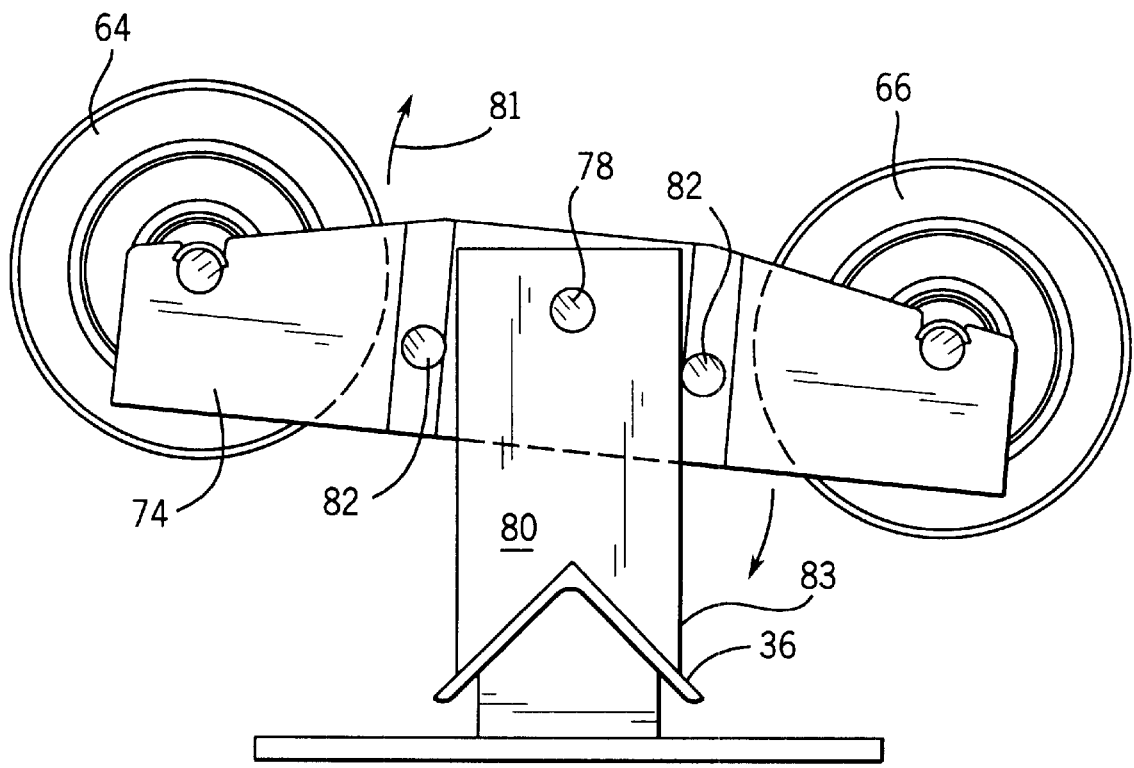
FIG. 11 is a side view similar to FIG. 10 illustrating the pivoting movement of the pivot brackets and the operation of the pivot limiting mechanism.

FIG. 11 illustrates the maximum possible rotation of the pivot bracket 74 relative to the mounting bracket 80. In this embodiment, the center rolls 64 and 66 can move upward or downward approximately half an inch. However, if either of the center rolls 64 or 66 became dislodged, the stop blocks 82 prevent the pivot bracket from contacting the moving conveyor belt.

Figure 12:
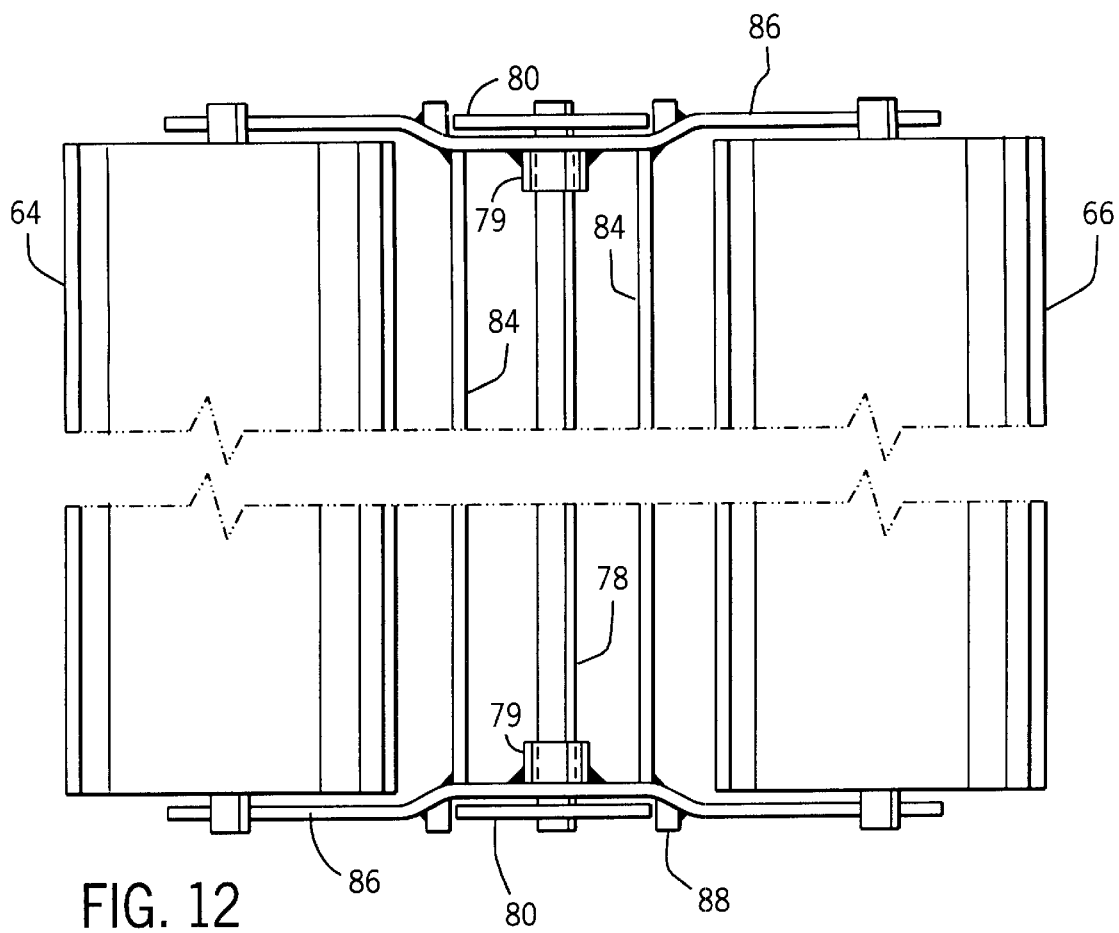
FIG. 12 is a top view of a pivot limiting mechanism of a third embodiment of the invention.
Figure 13:
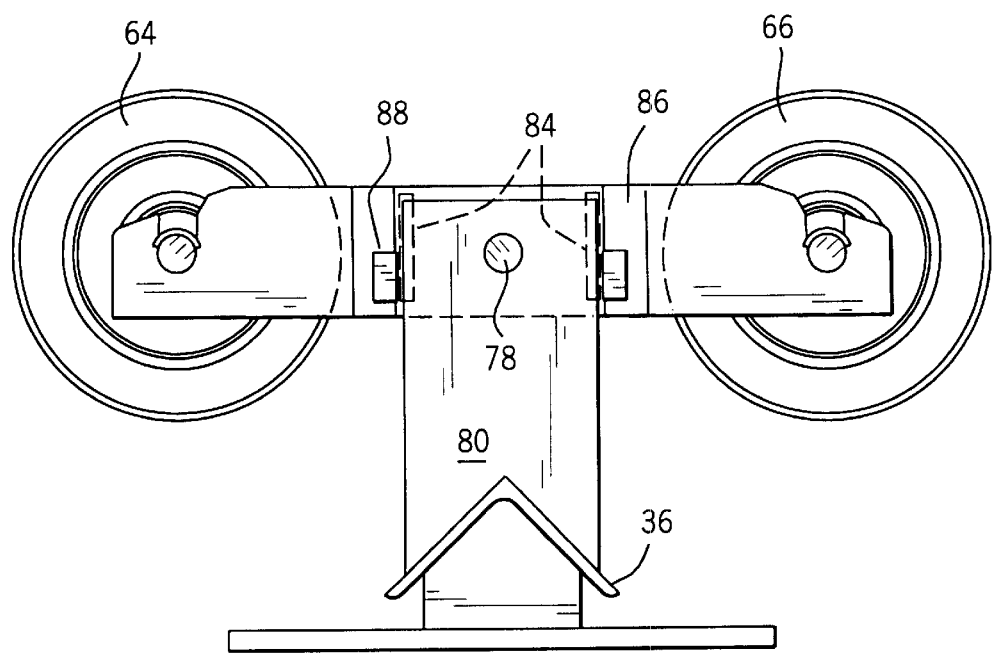
FIG. 13 is a side view of the third embodiment of the pivot limiting mechanism.

Referring now to FIGS. 12 and 13, there shown is another alternate configuration of the pivot limiting mechanism of the present invention. In the embodiment of the invention illustrated in FIG. 12, a pair of trough braces 84 terminate at the inner surface of the pair of pivot brackets 86. In the embodiment of the invention illustrated, a pair of stop blocks 88 extend from the outer surface of the pivot brackets 86. The stop blocks 88 are spaced a distance slightly greater than the width of the mounting bracket 80. Like the embodiment of the invention illustrated in FIGS. 9–11, the stop blocks 88 protrude from the pivot brackets 86 and limit the amount of possible pivoting movement of the pair of pivot brackets 86 in both the clockwise and counter clockwise directions. In the preferred embodiment of the invention, each of the stop blocks 88 is a metallic member that is welded to the outer surface of the pivot bracket 86. Although the embodiment illustrated in FIGS. 12 and 13 includes a pair of cross braces 84, it should be understood that the cross braces 84 could be eliminated if stability was not an issue, since the stop blocks 88 are separately attached to the pair of pivot brackets 86.

Although the pivot limiting mechanisms of the present invention are all shown with a troughing idler having center rolls that are larger in diameter than the pair of side troughing rolls, it should be understood that the pivot limiting mechanisms could be used with prior art idlers in which the center rolls have the same diameter as the side rolls. In either case, the pivot limiting mechanisms prevent the uncontrolled rotation of the pivot brackets.

Various alternatives and embodiments are contemplated as being within the scope of the following claims particularly pointing out and distinctly claiming the subject matter regarded as the invention.

I claim:

1. A troughing idler for use in supporting a conveyor belt of a troughed belt conveyor, the troughing idler comprising:
 a support frame has a base extending transverse to the direction of conveyor belt travel;
 a pair of mounting brackets connected to the base of the support frame;
 a pivot bracket assembly mounted between the mounting brackets, the pivot bracket assembly including a pair of spaced pivot brackets rotatably supported between the pair of mounting brackets;
 a fore center roll rotatably supported on the pivot bracket assembly;
 an aft center roll rotatably supported on the pivot bracket assembly, wherein the pivot bracket assembly is pivotable to move both the fore center roll and the aft center roll into contact with the conveyor belt; and
 at least one stop block formed on each pivot bracket of the pivot bracket assembly, the stop blocks being positioned to contact the mounting bracket when the pivot bracket assembly pivots relative to the pivot bracket, wherein the stop block limits the amount of rotation of the pivot bracket assembly.

2. The troughing idler of claim 1 wherein the pivot bracket assembly includes a pair of stop blocks extending from each of the pivot brackets, the stop blocks being positioned on opposite sides of the mounting bracket to limit the rotation of the pivot bracket assembly.

3. The troughing idler of claim 2 wherein each of the pivot brackets includes an outer face surface, wherein the stop blocks extend from the outer face surface and toward the mounting brackets.

4. The troughing idler of claim 3 wherein each of the stop blocks is welded to the outer face surface of the pivot bracket.

5. The troughing idler of claim 1 wherein the pivot bracket assembly includes a pair of support braces each extending between the pair of spaced pivot brackets, wherein each support brace extends through both of the pivot brackets to define stop blocks protruding from each of the pivot brackets, the stop blocks protruding from each of the pivot brackets being positioned on opposite sides of the mounting bracket to limit the rotation of the pivot bracket assembly in both the clockwise direction and the counterclockwise direction.

6. The troughing idler of claim 5 wherein each of the pivot brackets includes an outer face surface, wherein the stop blocks protrude from the outer face surface and toward the mounting bracket.

7. The troughing idler of claim 2 wherein the stop blocks are spaced from the mounting brackets such that the pivot bracket assembly can rotate in both the clockwise direction and the counterclockwise direction such that the fore center roll and the aft center roll are movable upwardly and downwardly.

8. The troughing idler of claim 1 wherein the pivot bracket assembly includes a pivot shaft extending between the pair of spaced pivot brackets, the pivot shaft being rotatably supported between the pair of mounting brackets.

9. A troughing idler for use in supporting a conveyor belt of a trough belt conveyor, the troughing idler comprising:
 a support frame having a base extending transverse to the direction of conveyor belt travel;
 a pair of mounting brackets connected to the base of the support frame;
 a pivot bracket assembly mounted between the pair of mounting brackets, the pivot bracket assembly including a pair of spaced pivot brackets rotatably supported between the pair of mounting brackets;
 a fore center roll rotatably supported on the pivot bracket assembly;
 an aft center roll rotatably supported on the pivot bracket assembly; and
 at least one stop surface formed on each of the pivot brackets, the stop surface positioned to contact the base of the support frame as the pivot bracket assembly rotates, wherein the stop surface limits the amount of rotation of the pivot bracket assembly.

10. A troughing idler for use in supporting a conveyor belt of a trough belt conveyor, the troughing idler comprising:
 a support frame having a base extending transverse to the direction of conveyor belt travel;
 a pair of mounting brackets connected to the base of the support frame;
 a pivot bracket assembly mounted between the pair of mounting brackets, the pivot bracket assembly including a pair of spaced pivot brackets rotatably supported between the pair of mounting brackets, wherein each of the pivot brackets includes a pivot notch having a shape generally corresponding to the exterior shape of the base of the support frame;
 a fore center roll rotatably supported on the pivot bracket assembly;
 an aft center roll rotatably supported on the pivot bracket assembly; and
 at least one stop surface formed as a portion of the pivot notch on each of the pivot brackets, the stop surface positioned to contact the base of the support frame as the pivot bracket assembly rotates, wherein the stop surface of the pivot notch contacts the base to limit rotation of the pivot bracket assembly.

11. The troughing idler of claim 10 wherein the pivot notch is spaced from the base of the support frame such that the pivot bracket assembly is rotatable in both the clockwise direction and the counterclockwise direction such that the fore center roll and the aft center roll are movable upwardly and downwardly.

* * * * *